(12) United States Patent
Huang et al.

(10) Patent No.: US 10,565,983 B2
(45) Date of Patent: Feb. 18, 2020

(54) ARTIFICIAL INTELLIGENCE-BASED ACOUSTIC MODEL TRAINING METHOD AND APPARATUS, DEVICE AND STORAGE MEDIUM

(71) Applicant: BAIDU ONLINE NETWORK TECHNOLOGY (BEIJING) CO., LTD., Haidian District Beijing (CN)

(72) Inventors: Bin Huang, Haidian District Beijing (CN); Yiping Peng, Haidian District Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 59 days.

(21) Appl. No.: 15/961,724

(22) Filed: Apr. 24, 2018

(65) Prior Publication Data

US 2018/0322865 A1 Nov. 8, 2018

(30) Foreign Application Priority Data

May 5, 2017 (CN) .......................... 2017 1 3126895

(51) Int. Cl.
*G10L 15/06* (2013.01)
*G10L 15/16* (2006.01)
*G10L 15/02* (2006.01)

(52) U.S. Cl.
CPC ............ *G10L 15/063* (2013.01); *G10L 15/16* (2013.01); *G10L 15/02* (2013.01); *G10L 2015/0631* (2013.01)

(58) Field of Classification Search
CPC ....... G10L 15/16; G10L 15/04; G10L 15/063; G10L 15/22
See application file for complete search history.

(56) References Cited

U.S. PATENT DOCUMENTS

| | | | | |
|---|---|---|---|---|
| 8,209,184 B1* | 6/2012 | Dragosh | ................. | G10L 15/30 704/270.1 |
| 8,364,486 B2* | 1/2013 | Basir | ....................... | G10L 15/02 704/251 |
| 9,324,321 B2* | 4/2016 | Xue | ...................... | G10L 15/075 |
| 9,589,565 B2* | 3/2017 | Boies | ...................... | G10L 15/22 |
| 9,620,145 B2* | 4/2017 | Bacchiani | ............... | G10L 25/30 |
| 9,653,093 B1* | 5/2017 | Matsoukas | ............... | G10L 15/08 |
| 9,786,270 B2* | 10/2017 | Senior | .................... | G10L 15/063 |
| 9,881,613 B2* | 1/2018 | Weinstein | ............. | G10L 15/063 |

(Continued)

FOREIGN PATENT DOCUMENTS

| | | | | |
|---|---|---|---|---|
| CN | | 105185372 A | 12/2015 | |
| CN | | 105206258 A | 12/2015 | |
| WO | WO-2017164954 A1 * | | 9/2017 | ............ G10L 15/16 |

*Primary Examiner* — Mohammad K Islam
(74) *Attorney, Agent, or Firm* — Brooks Kushman PC

(57) ABSTRACT

The present disclosure provides an artificial intelligence-based acoustic model training method and apparatus, a device and a storage medium, wherein the method comprises: obtaining manually-annotated speech data; training according to the manually-annotated speech data to obtain a first acoustic model; obtaining unannotated speech data; training according to the unannotated speech data and the first acoustic model to obtain a desired second acoustic model. The solution of the present disclosure can be applied to save manpower costs and improve the training efficiency.

18 Claims, 4 Drawing Sheets

(56) References Cited

U.S. PATENT DOCUMENTS

| | | | |
|---|---|---|---|
| 9,940,933 B2* | 4/2018 | Choi | G10L 15/183 |
| 9,984,683 B2* | 5/2018 | Li | G10L 15/16 |
| 10,019,438 B2* | 7/2018 | Audhkhasi | G06F 17/28 |
| 10,074,360 B2* | 9/2018 | Kim | G10L 15/01 |
| 10,127,904 B2* | 11/2018 | Rao | G10L 15/187 |
| 10,198,435 B2* | 2/2019 | Na | G06N 3/0454 |
| 10,204,620 B2* | 2/2019 | Cui | G10L 15/16 |
| 2004/0030556 A1* | 2/2004 | Bennett | G06F 17/27 704/270 |
| 2008/0167872 A1* | 7/2008 | Okimoto | G10L 15/22 704/251 |
| 2009/0319267 A1* | 12/2009 | Kurki-Suonio | G10L 15/30 704/235 |
| 2010/0228548 A1* | 9/2010 | Liu | G10L 15/065 704/251 |
| 2013/0185072 A1* | 7/2013 | Huang | G10L 15/30 704/246 |
| 2014/0257805 A1* | 9/2014 | Huang | G10L 15/063 704/232 |
| 2016/0093291 A1* | 3/2016 | Kim | G10L 15/01 381/56 |
| 2016/0093294 A1* | 3/2016 | Kapralova | G10L 15/063 704/232 |
| 2016/0155443 A1* | 6/2016 | Khan | G06F 1/3203 704/275 |
| 2016/0163310 A1* | 6/2016 | Lee | G10L 15/16 704/232 |
| 2016/0180214 A1* | 6/2016 | Kanevsky | G06N 3/0454 706/21 |
| 2017/0011738 A1* | 1/2017 | Senior | G10L 15/063 |
| 2017/0018272 A1* | 1/2017 | Lee | H04N 21/4394 |
| 2017/0032244 A1* | 2/2017 | Kurata | G10L 15/063 |
| 2017/0053652 A1* | 2/2017 | Choi | G10L 15/32 |
| 2017/0169812 A1* | 6/2017 | Lample | G06F 17/2765 |
| 2017/0169815 A1* | 6/2017 | Zhan | G10L 15/075 |
| 2017/0236510 A1* | 8/2017 | Fuchiwaki | G10L 15/22 704/251 |
| 2018/0068675 A1* | 3/2018 | Variani | G10L 25/30 |
| 2018/0075844 A1* | 3/2018 | Kim | G10L 15/144 |
| 2018/0122372 A1* | 5/2018 | Wanderlust | G10L 15/22 |
| 2018/0137857 A1* | 5/2018 | Zhou | G10L 15/02 |
| 2018/0174576 A1* | 6/2018 | Soltau | G10L 15/16 |
| 2018/0174589 A1* | 6/2018 | Choi | G10L 15/32 |
| 2018/0182383 A1* | 6/2018 | Kim | G06N 5/04 |
| 2018/0190268 A1* | 7/2018 | Lee | G10L 15/16 |
| 2018/0197533 A1* | 7/2018 | Lyon | G10L 15/16 |
| 2018/0247643 A1* | 8/2018 | Battenberg | G10L 15/02 |
| 2018/0254036 A1* | 9/2018 | Li | G06F 17/27 |
| 2018/0277100 A1* | 9/2018 | Cassagne | G10L 15/16 |
| 2018/0308487 A1* | 10/2018 | Goel | G10L 15/1815 |
| 2018/0314689 A1* | 11/2018 | Wang | G06F 17/2785 |
| 2018/0330714 A1* | 11/2018 | Paulik | G10L 15/32 |
| 2018/0366105 A1* | 12/2018 | Kim | G10L 15/22 |
| 2019/0113917 A1* | 4/2019 | Buch | G05D 1/0088 |

* cited by examiner

ARTIFICIAL INTELLIGENCE-BASED ACOUSTIC MODEL TRAINING METHOD AND APPARATUS, DEVICE AND STORAGE MEDIUM

The present application claims the priority of Chinese Patent Application No. 2017103126895, filed on May 5, 2017, with the title of "Artificial intelligence-based acoustic model training method and apparatus, device and storage medium".

FIELD OF THE DISCLOSURE

The present disclosure relates to computer application technologies, and particularly to an artificial intelligence-based acoustic model training method and apparatus, a device and a storage medium.

BACKGROUND OF THE DISCLOSURE

Artificial intelligence, as abbreviated as AI, is a new technical science for researching and developing theories, methods, technologies and application systems for simulating, extending and expanding human intelligence. Artificial intelligence is a branch of computer science and attempts to learn about the essence of intelligence, and produce a new intelligent machine capable of responding in a manner similar to human intelligence. The studies in the field comprise robots, language recognition, image recognition, natural language processing, expert systems and the like.

An acoustic model is one of most important portions in a speech recognition system. Training the acoustic model needs a large amount of speech data. The more data there are, the higher accuracy the trained acoustic model has, and correspondingly, the higher accuracy a speech recognition result has.

In the prior art, manually-annotated speech data are usually employed to train the acoustic model.

However, manual annotation of a large amount of speech data needs to consume very high manpower costs and reduces the training efficiency of the acoustic model.

SUMMARY OF THE DISCLOSURE

In view of the above, the present disclosure provides an artificial intelligence-based acoustic model training method and apparatus, a device and a storage medium, which can save manpower costs and improve the training efficiency.

Specific technical solutions are as follows:

An artificial intelligence-based acoustic model training method, comprising:

obtaining manually-annotated speech data;

training according to the manually-annotated speech data to obtain a first acoustic model;

obtaining unannotated speech data;

training according to the unannotated speech data and the first acoustic model to obtain a desired second acoustic model.

According to a preferred embodiment of the present disclosure, a type of each of the first acoustic model and the second acoustic model comprises an acoustic model having a hybrid structure of a convolutional neural network and a recurrent neural network.

According to a preferred embodiment of the present disclosure, the training according to the manually-annotated speech data to obtain a first acoustic model comprises:

determining an alignment relationship of each speech frame and a manually-annotated syllable state according to the manually-annotated speech data;

considering the alignment relationship as a training target and training the first acoustic model based on a first rule to obtain the first acoustic model in an initial state;

considering the alignment relationship as a training target and further training the first acoustic model in the initial state based on a second rule to obtain the first acoustic model.

According to a preferred embodiment of the present disclosure, the training according to the unannotated speech data and the first acoustic model to obtain a desired second acoustic model comprises:

inputting the unannotated speech data to the first acoustic model to obtain the alignment relationship of each speech frame output by the first acoustic model and a corresponding syllable state;

considering the alignment relationship as a training target and training the second acoustic model based on a first rule to obtain the second acoustic model in an initial state;

considering the alignment relationship as a training target and further training the second acoustic model in the initial state based on a second rule to obtain the second acoustic model.

According to a preferred embodiment of the present disclosure, the first rule comprises a Cross Entropy CE rule;

the second rule comprises a Connectionist Temporal Classification CTC rule.

According to a preferred embodiment of the present disclosure, before training according to the manually-annotated speech data to obtain the first acoustic model, the method further comprises: extracting an acoustic feature from the manually-annotated speech data;

the training according to the manually-annotated speech data to obtain the first acoustic model comprises: training according to the acoustic feature extracted from the manually-annotated speech data to obtain the first acoustic model;

before training according to the unannotated speech data and the first acoustic model to obtain the desired second acoustic model, the method further comprises: extracting the acoustic feature from the unannotated speech data;

the training according to the unannotated speech data and the first acoustic model to obtain the desired second acoustic model comprises: training according to the acoustic feature extracted from the unannotated speech data and the first acoustic model to obtain the second acoustic model.

According to a preferred embodiment of the present disclosure, the extracting the acoustic feature from the speech data comprises:

performing Fast Fourier Transformation FFT for the speech data with a preset first time length as a frame length and with a preset second time length as a frame shift;

extracting an Mel-scale Filter Bank thank acoustic feature according to an FFT transformation result.

An artificial intelligence-based acoustic model training apparatus, comprising a first obtaining unit, a first training unit, a second obtaining unit and a second training unit;

the first obtaining unit is configured to obtain and send manually-annotated speech data to the first training unit;

the first training unit is configured to train according to the manually-annotated speech data to obtain a first acoustic model and send the first acoustic model to the second training unit;

the second obtaining unit is configured to obtain and send unannotated speech data to the second training unit;

the second training unit is configured to train according to the unannotated speech data and the first acoustic model to obtain a desired second acoustic model.

According to a preferred embodiment of the present disclosure, a type of each of the first acoustic model and the second acoustic model comprises an acoustic model having a hybrid structure of a convolutional neural network and a recurrent neural network.

According to a preferred embodiment of the present disclosure, the first training unit determines an alignment relationship of each speech frame and a manually-annotated syllable state according to the manually-annotated speech data;

considers the alignment relationship as a training target and trains the first acoustic model based on a first rule to obtain the first acoustic model in an initial state;

considers the alignment relationship as a training target and further trains the first acoustic model in the initial state based on a second rule to obtain the first acoustic model.

According to a preferred embodiment of the present disclosure, the second training unit inputs the unannotated speech data to the first acoustic model to obtain the alignment relationship of each speech frame output by the first acoustic model and a corresponding syllable state;

considers the alignment relationship as a training target and trains the second acoustic model based on a first rule to obtain the second acoustic model in an initial state;

considers the alignment relationship as a training target and further trains the second acoustic model in the initial state based on a second rule to obtain the second acoustic model.

According to a preferred embodiment of the present disclosure, the first rule comprises a Cross Entropy CE rule; the second rule comprises a Connectionist Temporal Classification CTC rule.

According to a preferred embodiment of the present disclosure, the first training unit is further configured to extract an acoustic feature from the manually-annotated speech data;

train according to the acoustic feature extracted from the manually-annotated speech data to obtain the first acoustic model;

the second training unit is further configured to extract the acoustic feature from the unannotated speech data;

train according to the acoustic feature extracted from the unannotated speech data and the first acoustic model to obtain the second acoustic model.

According to a preferred embodiment of the present disclosure, the first training unit performs Fast Fourier Transformation FFT for the manually-annotated speech data with a preset first time length as a frame length and with a preset second time length as a frame shift, and extracts an Mel-scale Filter Bank thank acoustic feature according to an FFT transformation result;

the second training unit performs FFT transformation for the unannotated speech data with the first time length as a frame length and with the second time length as a frame shift, and extracts an (bank acoustic feature according to an FFT transformation result.

A computer device, comprising a memory, a processor and a computer program which is stored on the memory and runs on the processor, the processor, upon executing the program, implementing the above-mentioned method.

A computer-readable storage medium on which a computer program is stored, the program, when executed by a processor, implementing the aforesaid method.

As can be seen from the above introduction, with the solutions of the present disclosure, the manually-annotated speech data are first obtained, the first acoustic model is obtained by training according to the manually-annotated speech data, then the unannotated speech data may be obtained, and the desired second acoustic model is obtained by training according to the unannotated speech data and the first acoustic model obtained from the training. As compared with the prior art, the solutions of the present disclosure only requires use of relatively less manually-annotated speech data, thereby saving man power costs and improving the training efficiency.

DETAILED DESCRIPTION OF PREFERRED EMBODIMENTS

With respect to problems existing in the prior art, the present disclosure provides an artificial intelligence-based acoustic model training scheme, which trains to obtain a first acoustic model with a high recognition rate as a reference model by using a deep learning method through already-annotated speech data, and uses the duly-trained reference model in combination with a large amount of unannotated speech data to train a second acoustic model that may be used for online products.

Technical solutions of the present disclosure will be described in more detail in conjunction with figures and embodiments to make technical solutions of the present disclosure clear and more apparent.

Obviously, the described embodiments are partial embodiments of the present disclosure, not all embodiments. Based on embodiments in the present disclosure, all other embodiments obtained by those having ordinary skill in the art without making inventive efforts all fall within the protection scope of the present disclosure.

Figure 1:
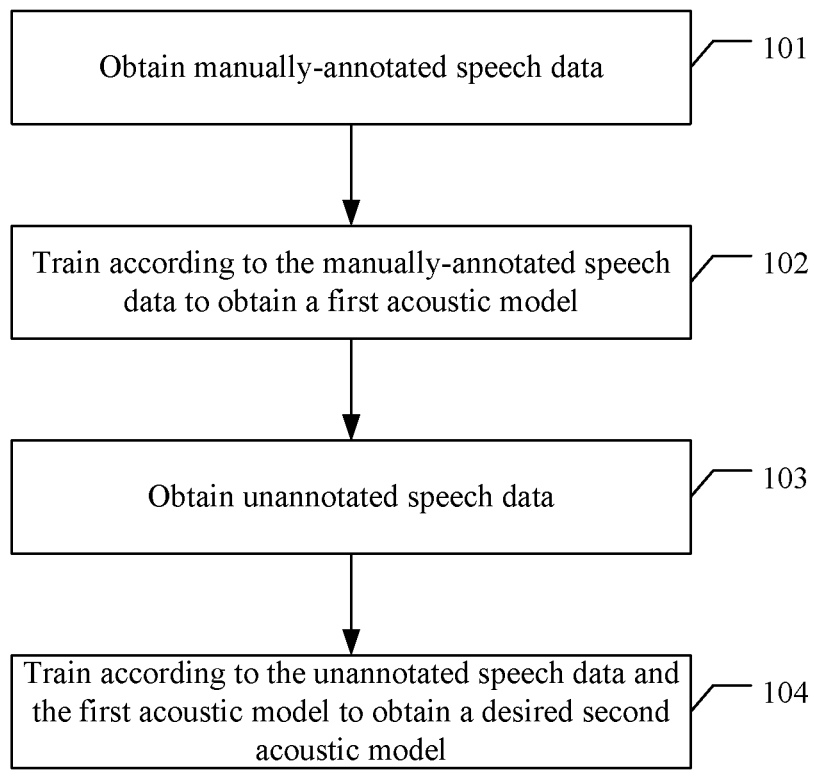
FIG. 1 is a flow chart of an embodiment of an artificial intelligence-based acoustic model training method according to the present disclosure.

FIG. 1 is a flow chart of an embodiment of an artificial intelligence-based acoustic model training method according to the present disclosure. As shown in FIG. 1, the embodiment comprises the following specific implementation mode.

In 101, manually-annotated speech data are obtained.

As compared with the prior art, the present embodiment only requires obtainment of very little manually-annotated speech data.

A specific obtaining manner is not limited. For example, it is feasible to manually mark the unannotated speech data, or buy manually-annotated speech data from a third-party data annotating company.

The manually-annotated speech data, after being obtained, may be further pre-processed.

The pre-processing may comprise: extracting an acoustic feature from the manually-annotated speech data.

A manner of extracting the acoustic features may be: performing Fast Fourier Transformation of the manually-annotated speech data with a preset first time length as a frame length and with a preset second time length as a frame shift, and extracting a Mel-scale Filter Bank (thank) acoustic feature according to an FFT transformation result, namely, extracting the thank acoustic feature with a Mel frequency window.

A specific value of the first time length and the second time length may depend on actual needs, for example, the first time length may be 20 ms, and the second time length may be 10 ms.

In addition to extracting the acoustic feature from the manually-annotated speech data, the pre-processing may further comprise: according to actual needs, clipping a valid audio length for example 300 frames for speech recognition, then screening the obtained manually-annotated speech data to remove speech data whose length is incompliant with a requirement, and then extracting the acoustic feature from the remaining speech data.

In 102, a first acoustic model is obtained by training according to the manually-annotated speech data.

A type of the first acoustic model may be an acoustic model having a hybrid structure of a convolutional neural network and a recurrent neural network.

It is feasible to, before training the first acoustic model, first determine an alignment relationship of each speech frame and a manually-annotated syllable state according to the manually-annotated speech data.

For example, it is feasible to determine alignment relationship of each speech frame and its manually-annotated syllable state through current technologies such as current annotation dictionary extension and Viterbi forced alignment. Specifically, the alignment relationship may refer to an alignment relationship of the acoustic feature of each speech frame and the manually-annotated syllable state.

Then, the first acoustic model is obtained by performing further training according to the above alignment relationship.

Upon training, it is feasible to first consider the above alignment relationship as a training target and train the first acoustic model based on a first rule to obtain the first acoustic model in an initial state, then consider the above alignment relationship as a training target and further train the first acoustic model in the initial state based on a second rule to obtain a finally-desired first acoustic model.

The first rule may be a Cross Entropy CE rule, that is, CE rule-based pre-training may be performed with the above alignment relationship as the training target to obtain the first acoustic model in the initial state.

The second rule may be a Connectionist Temporal Classification CTC rule, i.e., the first acoustic model in the initial state is further trained based on the CTC rule with the above alignment relationship as the training target to obtain the first acoustic model.

It can be seen that the same alignment relationship is used when the training of the first acoustic model is performed based on different rules, and the training based on the CTC rule is performed on the basis of the CE rule-based training, i.e., the first acoustic model obtained by training based on the CE rule is further trained based on the CTC rule to obtain the finally-desired first acoustic model.

To enable the first acoustic model to predict a corresponding relationship of a speech frame and a phone, it is necessary to first allow the first acoustic model to learn from the already-existing alignment relationship, the CE rule and the CTC rule corresponding to two different learning manners.

How to train the first acoustic model based on the CE rule and the CTC rule is of the prior art.

The above procedure of training the first acoustic model may be called a supervised training phase, the obtained first acoustic model may be called a reference model, parameters of the reference model are fixed upon completion of the training, and the manually-annotated speech data are not subsequently used any more.

In 103, unannotated speech data are obtained.

For example, the unannotated speech data of an online speech product may be obtained.

Likewise, after the unannotated speech data are obtained, pre-processing may be performed therefor.

The pre-processing may comprise extracting an acoustic feature from the unannotated speech data.

A manner of extracting the acoustic feature may be: performing FFT transformation for the unannotated speech data with a preset first time length as a frame length and with a preset second time length as a frame shift, and extracting an (bank acoustic feature according to an FFT transformation result.

A specific value of the first time length and the second time length may depend on actual needs, for example, the first time length may be 20 ms, and the second time length may be 10 ms.

In addition to extracting the acoustic feature from the unannotated speech data, the pre-processing may further comprise: according to actual needs, clipping a valid audio length for example 300 frames for speech recognition.

In 104, a desired second acoustic model is obtained by training according to the unannotated speech data and the first acoustic model.

A type of the second acoustic model may be an acoustic model having a hybrid structure of a convolutional neural network and a recurrent neural network.

Since the unannotated speech data is used when training is performed, the alignment relationship cannot be obtained in the manner stated in 102. However, the first acoustic model is previously obtained by training, the unannotated speech data may be input to the first acoustic model to obtain the alignment relationship of each speech frame output by the first acoustic model and a corresponding syllable state.

For example, it is feasible to input the acoustic feature extracted from the unannotated speech data to the first acoustic model to obtain the alignment relationship of each speech frame output by the first acoustic model and a corresponding syllable state.

Then, it is feasible to consider the obtained alignment relationship as a training target and train the second acoustic model based on a first rule to obtain the second acoustic model in an initial state, then consider the obtained alignment relationship as a training target and further train the second acoustic model in the initial state based on a second rule to obtain a finally-desired second acoustic model.

Specifically, the first rule may be a CE rule, that is, CE rule-based pre-training may be performed with the above alignment relationship as the training target to obtain the second acoustic model in the initial state.

The second rule may be a CTC rule, i.e., the second acoustic model in the initial state is further trained based on the CTC rule with the above alignment relationship as the training target to obtain the second acoustic model.

The above procedure of training the second acoustic model may be called an unsupervised training phase.

Figure 2:
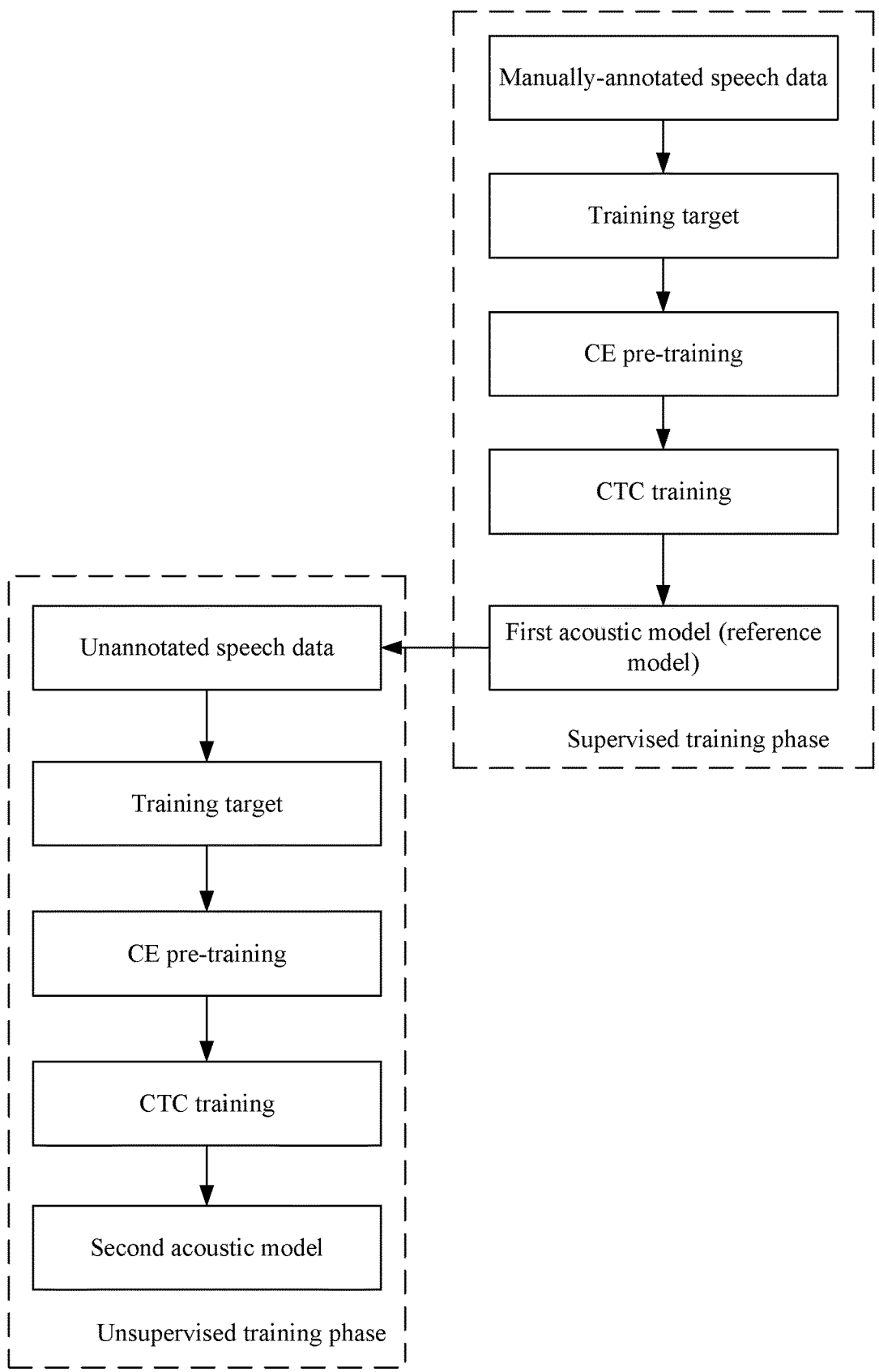
FIG. 2 is a schematic diagram of an implementation procedure of an artificial intelligence-based acoustic model training method according to the present disclosure.

Based on the above introduction, FIG. 2 is a schematic diagram of an implementation procedure of an artificial intelligence-based acoustic model training method according to the present disclosure. As shown in FIG. 2, first, the alignment relationship as the training target may be determined according to the obtained manually-annotated speech data, then the CE rule-based pre-training and the CTC rule-based training may be performed in turn to obtain the first acoustic model. This procedure may be called a supervised training phase. Then, the alignment relationship as the training target may be determined according to the first acoustic model with respect to a large amount of obtained unannotated speech data, and the CE rule-based pre-training and the CTC rule-based training may be performed in turn to obtain the second acoustic model. This procedure may be called an unsupervised training phase.

After the second acoustic model is obtained, the second acoustic model may be used to perform actual speech recognition.

In the solution of the present embodiment, the first acoustic model is obtained by training by using the deep learning method and through the already-annotated speech data and considered as the reference model, then the second acoustic model for use on an online product is obtained by training through the reference model obtained from training and in combination with a large amount of unannotated speech data. As compared with the prior art, the solution of the present embodiment substantially reduces the amount of speech data to be manually annotated, thereby saving man power costs and improving model-training efficiency. In addition, the large amount of unannotated speech data may be employed to train to obtain the second acoustic model, thereby improving the accuracy of the second acoustic model and enhancing the accuracy of subsequent speech recognition results.

The above introduces the method embodiments. The solution of the present disclosure will be further described through an apparatus embodiment.

Figure 3:
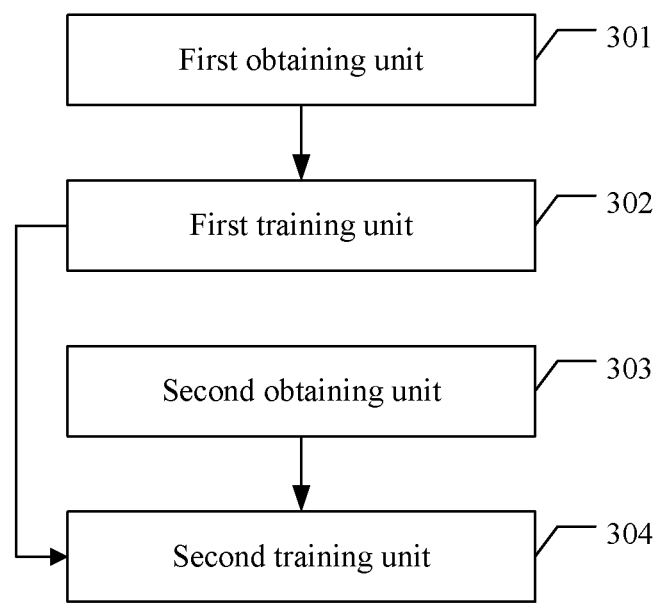
FIG. 3 is a structural schematic view of components of an embodiment of an artificial intelligence-based acoustic model training apparatus according to the present disclosure.

FIG. 3 is a structural schematic view of components of an embodiment of an artificial intelligence-based acoustic model training apparatus according to the present disclosure. As shown in FIG. 3, the apparatus comprises a first obtaining unit 301, a first training unit 302, a second obtaining unit 303 and a second training unit 304.

The first obtaining unit 301 is configured to obtain and send manually-annotated speech data to the first training unit.

The first training unit 302 is configured to train according to the manually-annotated speech data to obtain a first acoustic model and send the first acoustic model to the second training unit 304.

The second obtaining unit 303 is configured to obtain and send unannotated speech data to the second training unit 304.

The second training unit 304 is configured to train according to the unannotated speech data and the first acoustic model to obtain a desired second acoustic model.

A type of each of the first acoustic model and the second acoustic model may be an acoustic model having a hybrid structure of a convolutional neural network and a recurrent neural network.

After the first obtaining unit 301 sends the obtained manually-annotated speech data to the first training unit 302, the first training unit 303 may first perform pre-processing for the obtained manually-annotated speech data, for example, extract an acoustic feature from the manually-annotated speech data.

Correspondingly, the first training unit 302 may train according to the acoustic feature extracted from the manually-annotated speech data to obtain the first acoustic model.

A manner of extracting the acoustic feature from the manually-annotated speech data may be: the first training unit 302 performs FFT transformation for the manually-annotated speech data with a preset first time length as a frame length and with a preset second time length as a frame shift, and extracts an fbank acoustic feature according to an FFT transformation result.

A specific value of the first time length and the second time length may depend on actual needs, for example, the first time length may be 20 ms, and the second time length may be 10 ms.

In addition, the first training unit 302 may further determine an alignment relationship of each speech frame and a manually-annotated syllable state according to the manually-annotated speech data. Specifically, the alignment relationship may refer to an alignment relationship of the acoustic feature of each speech frame and the manually-annotated syllable state.

Then, the first training unit 302 may train according to the above alignment relationship to obtain the first acoustic model.

Upon training, the first training unit 302 may first consider the above alignment relationship as a training target and train the first acoustic model based on a first rule to obtain the first acoustic model in an initial state, then consider the above alignment relationship as a training target and further train the first acoustic model in the initial state based on a second rule to obtain a finally-desired first acoustic model.

The first rule may be a CE rule, that is, the first training unit 302 may perform CE rule-based pre-training with the above alignment relationship as the training target, to obtain the first acoustic model in the initial state.

The second rule may be a CTC rule, i.e., the first training unit 302 may further train the first acoustic model in the initial state based on the CTC rule with the above alignment relationship as the training target, to obtain the first acoustic model.

The second obtaining unit 303 obtains and sends unannotated speech data to the second training unit 304.

The second training unit 304 may first perform pre-processing for the obtained unannotated speech data, e.g., extract the acoustic feature from the unannotated speech data.

Correspondingly, subsequently the second training unit 304 may train according to the acoustic feature extracted from the unannotated speech data and the first acoustic model to obtain the second acoustic model.

A manner of extracting the acoustic feature from the unannotated speech data may be: the second training unit 304 performs FFT transformation for the unannotated speech data with a first time length as a frame length and with a second time length as a frame shift, and extracts an thank acoustic feature according to an FFT transformation result.

A specific value of the first time length and the second time length may depend on actual needs, for example, the first time length may be 20 ms, and the second time length may be 10 ms.

Then, the second training unit 304 may input the unannotated speech data to the first acoustic model to obtain the alignment relationship of each speech frame output by the first acoustic model and a corresponding syllable state.

For example, the second training unit 304 may input the acoustic feature extracted from the unannotated speech data to the first acoustic model to obtain the alignment relationship of each speech frame output by the first acoustic model and a corresponding syllable state.

Then, the second training unit 304 may consider the alignment relationship as a training target and train the second acoustic model based on a first rule to obtain the second acoustic model in an initial state, and furthermore consider the alignment relationship as a training target and further train the second acoustic model in the initial state based on a second rule to obtain a finally-desired second acoustic model.

The first rule may be a CE rule, and the second rule may be a CTC rule.

After the second acoustic model is obtained, the second acoustic model may be used to perform actual speech recognition.

Reference may be made to corresponding depictions in the aforesaid method embodiment for a specific workflow of the apparatus embodiment shown in FIG. 3. The workflow is not detailed any more.

In the solution of the present embodiment, the first acoustic model is obtained by training by using the deep learning method and through the already-annotated speech data and considered as a reference model, then the second acoustic model for use on an online product is obtained by training through the reference model obtained from training and in combination with a large amount of unannotated speech data. As compared with the prior art, the solution of the present embodiment substantially reduces the amount of speech data to be manually annotated, thereby saving man power costs and improving model-training efficiency. In addition, the large amount of unannotated speech data may be employed to train to obtain the second acoustic model, thereby improving the accuracy of the second acoustic model and enhancing the accuracy of subsequent speech recognition results.

Figure 4:
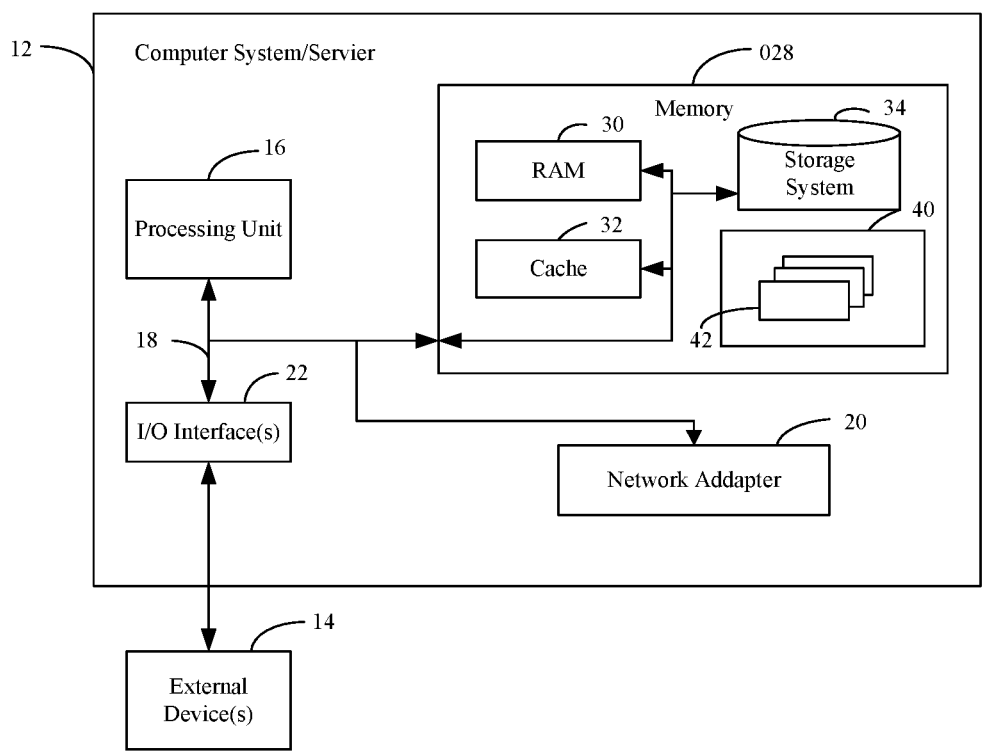
FIG. 4 illustrates a block diagram of an example computer system/server 12 adapted to implement an implementation mode of the present disclosure.

FIG. 4 illustrates a block diagram of an example computer system/server 12 adapted to implement an implementation mode of the present disclosure. The computer system/server 12 shown in FIG. 4 is only an example and should not bring about any limitation to the function and scope of use of the embodiments of the present disclosure.

As shown in FIG. 4, the computer system/server 12 is shown in the form of a general-purpose computing device. The components of computer system/server 12 may include, but are not limited to, one or more processors (processing units) 16, a memory 28, and a bus 18 that couples various system components including system memory 28 and the processor 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 4 and typically called a "hard drive"). Although not shown in FIG. 4, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. The memory 28 may include at least one program product having a set (e.g., at least one) of program modules that are configured to carry out the functions of embodiments of the present disclosure.

Program/utility 40, having a set (at least one) of program modules 42, may be stored in the system memory 28 by way of example, and not limitation, as well as an operating system, one or more disclosure programs, other program modules, and program data. Each of these examples or a certain combination thereof might include an implementation of a networking environment. Program modules 42 generally carry out the functions and/or methodologies of embodiments of the present disclosure.

Computer system/server 12 may also communicate with one or more external devices 14 such as a keyboard, a pointing device, a display 24, etc.; with one or more devices that enable a user to interact with computer system/server 12; and/or with any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted in FIG. 4, network adapter 20 communicates with the other communication modules of computer system/server 12 via bus 18. It should be understood that although not shown, other hardware and/or software modules could be used in conjunction with computer system/server 12. Examples, include, but are not limited to: microcode, device drivers, redundant processing units, external disk drive arrays, RAID systems, tape drives, and data archival storage systems, etc.

The processor 16 executes various function applications and data processing by running programs stored in the memory 28, for example, implement the method in the embodiment shown in FIG. 1, namely, obtaining manually-annotated speech data; training according to the manually-annotated speech data to obtain a first acoustic model; obtaining unannotated speech data; training according to the unannotated speech data and the first acoustic model to obtain a desired second acoustic model.

Reference may be made to related depictions in the above embodiments for specific implementations, which will not be detailed any more.

The present disclosure meanwhile provides a computer-readable storage medium on which a computer program is stored, the program, when executed by a processor, implementing the method stated in the embodiment shown in FIG. 1.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. An artificial intelligence-based acoustic model training method, wherein the method comprises: obtaining manually-annotated speech data; training according to the manually-annotated speech data to obtain a first acoustic model; obtaining unannotated speech data; and training according to the unannotated speech data and the first acoustic model to obtain a desired second acoustic model, wherein the training according to the manually-annotated speech data to obtain a first acoustic model comprises: determining an alignment relationship of each speech frame and a manually-annotated syllable state according to the manually-annotated speech data; considering the alignment relationship as a training target and training the first acoustic model based on a first rule to obtain a first acoustic model in an initial state; and considering the alignment relationship as a training target and further training the first acoustic model in the initial state based on a second rule to obtain the first acoustic model.

2. The method according to claim 1, wherein a type of each of the first acoustic model and the second acoustic model comprises an acoustic model having a hybrid structure of a convolutional neural network and a recurrent neural network.

3. The method according to claim 1, wherein the training according to the unannotated speech data and the first acoustic model to obtain a desired second acoustic model comprises: inputting the unannotated speech data to the first acoustic model to obtain the alignment relationship of each speech frame and a corresponding syllable state output by the first acoustic model; considering the alignment relationship as a training target and training the second acoustic model based on a first rule to obtain a second acoustic model in an initial state; considering the alignment relationship as a training target and further training the second acoustic model in the initial state based on a second rule to obtain the second acoustic model.

4. The method according to claim 3, wherein the first rule comprises a Cross Entropy CE rule; the second rule comprises a Connectionist Temporal Classification CTC rule.

5. The method according to claim 1, wherein before training according to the manually-annotated speech data to obtain a first acoustic model, the method further comprises: extracting an acoustic feature from the manually-annotated speech data; the training according to the manually-annotated speech data to obtain a first acoustic model comprises:

training according to the acoustic feature extracted from the manually-annotated speech data to obtain the first acoustic model; before training according to the unannotated speech data and the first acoustic model to obtain a desired second acoustic model, the method further comprises: extracting the acoustic feature from the unannotated speech data; the training according to the unannotated speech data and the first acoustic model to obtain a desired second acoustic model comprises: training according to the acoustic feature extracted from the unannotated speech data and the first acoustic model to obtain the second acoustic model.

6. The method according to claim 5, wherein the extracting an acoustic feature from a speech data comprises: performing Fast Fourier Transformation FFT for the speech data with a preset first time length as a frame length and with a preset second time length as a frame shift; extracting an Mel-scale Filter Bank fbank acoustic feature according to an FFT transformation result.

7. A computer device, comprising a memory, a processor and a computer program which is stored on the memory and runs on the processor, wherein the processor, upon executing the program, implements the following operation: obtaining manually-annotated speech data; training according to the manually-annotated speech data to obtain a first acoustic model; obtaining unannotated speech data; and training according to the unannotated speech data and the first acoustic model to obtain a desired second acoustic model, wherein the training according to the manually-annotated speech data to obtain a first acoustic model comprises: determining an alignment relationship of each speech frame and a manually-annotated syllable state according to the manually-annotated speech data; considering the alignment relationship as a training target and training the first acoustic model based on a first rule to obtain a first acoustic model in an initial state; and considering the alignment relationship as a training target and further training the first acoustic model in the initial state based on a second rule to obtain the first acoustic model.

8. The computer device according to claim 7, wherein a type of each of the first acoustic model and the second acoustic model comprises an acoustic model having a hybrid structure of a convolutional neural network and a recurrent neural network.

9. The computer device according to claim 7, wherein the training according to the unannotated speech data and the first acoustic model to obtain a desired second acoustic model comprises: inputting the unannotated speech data to the first acoustic model to obtain the alignment relationship of each speech frame and a corresponding syllable state output by the first acoustic model; considering the alignment relationship as a training target and training the second acoustic model based on a first rule to obtain a second acoustic model in an initial state; considering the alignment relationship as a training target and further training the second acoustic model in the initial state based on a second rule to obtain the second acoustic model.

10. The computer device according to claim 9, wherein the first rule comprises a Cross Entropy CE rule; the second rule comprises a Connectionist Temporal Classification CTC rule.

11. The computer device according to claim 7, wherein before training according to the manually-annotated speech data to obtain a first acoustic model, the operation further comprises: extracting an acoustic feature from the manually-annotated speech data; the training according to the manually-annotated speech data to obtain a first acoustic model comprises: training according to the acoustic feature extracted from the manually-annotated speech data to obtain the first acoustic model; before training according to the unannotated speech data and the first acoustic model to obtain a desired second acoustic model, the operation further comprises: extracting the acoustic feature from the unannotated speech data; the training according to the unannotated speech data and the first acoustic model to obtain a desired second acoustic model comprises: training according to the acoustic feature extracted from the unannotated speech data and the first acoustic model to obtain the second acoustic model.

12. The computer device according to claim 11, wherein the extracting an acoustic feature from a speech data comprises: performing Fast Fourier Transformation FFT for the speech data with a preset first time length as a frame length and with a preset second time length as a frame shift; extracting an Mel-scale Filter Bank fbank acoustic feature according to an FFT transformation result.

13. A non-transitory computer-readable storage medium on which a computer program is stored, wherein the program, when executed by a processor, implements the following operation: obtaining manually-annotated speech data; training according to the manually-annotated speech data to obtain a first acoustic model; obtaining unannotated speech data; and training according to the unannotated speech data and the first acoustic model to obtain a desired second acoustic model, wherein the training according to the manually-annotated speech data to obtain a first acoustic model comprises: determining an alignment relationship of each speech frame and a manually-annotated syllable state according to the manually-annotated speech data; considering the alignment relationship as a training target and training the first acoustic model based on a first rule to obtain a first acoustic model in an initial state; and considering the alignment relationship as a training target and further training the first acoustic model in the initial state based on a second rule to obtain the first acoustic model.

14. The non-transitory computer-readable storage medium according to claim 13, wherein a type of each of the first acoustic model and the second acoustic model comprises an acoustic model having a hybrid structure of a convolutional neural network and a recurrent neural network.

15. The non-transitory computer-readable storage medium according to claim 13, wherein the training according to the unannotated speech data and the first acoustic model to obtain a desired second acoustic model comprises: inputting the unannotated speech data to the first acoustic model to obtain the alignment relationship of each speech frame and a corresponding syllable state output by the first acoustic model; considering the alignment relationship as a training target and training the second acoustic model based on a first rule to obtain a second acoustic model in an initial state; considering the alignment relationship as a training target and further training the second acoustic model in the initial state based on a second rule to obtain the second acoustic model.

16. The non-transitory computer-readable storage medium according to claim 15, wherein the first rule comprises a Cross Entropy CE rule; the second rule comprises a Connectionist Temporal Classification CTC rule.

17. The non-transitory computer-readable storage medium according to claim 13, wherein before training according to the manually-annotated speech data to obtain a first acoustic model, the operation further comprises: extracting an acoustic feature from the manually-annotated speech data; the training according to the manually-annotated speech data to obtain a first acoustic model comprises: training according to the acoustic feature extracted from the manually-annotated speech data to obtain the first acoustic model; before training according to the unannotated speech data and the first acoustic model to obtain a desired second acoustic model, the operation further comprises: extracting the acoustic feature from the unannotated speech data; the training according to the unannotated speech data and the first acoustic model to obtain a desired second acoustic model comprises: training according to the acoustic feature extracted from the unannotated speech data and the first acoustic model to obtain the second acoustic model.

18. The non-transitory computer-readable storage medium according to claim 17, wherein the extracting an acoustic feature from a speech data comprises: performing Fast Fourier Transformation FFT for the speech data with a preset first time length as a frame length and with a preset second time length as a frame shift; extracting an Mel-scale Filter Bank fbank acoustic feature according to an FFT transformation result.

* * * * *

UNITED STATES PATENT AND TRADEMARK OFFICE
CERTIFICATE OF CORRECTION

PATENT NO. : 10,565,983 B2  
APPLICATION NO. : 15/961724  
DATED : February 18, 2020  
INVENTOR(S) : Huang et al.

Page 1 of 1

It is certified that error appears in the above-identified patent and that said Letters Patent is hereby corrected as shown below:

On the Title Page

Delete:
"(30)   Foreign Application Priority Data  
May 5, 2017   (CN)   2017 1 3126895"

And insert:
-- (30)   Foreign Application Priority Data  
May 5, 2017   (CN)   2017 1 03126895 --

Signed and Sealed this  
Sixth Day of October, 2020

Andrei Iancu  
*Director of the United States Patent and Trademark Office*